US006732142B1

(12) United States Patent
Bates et al.

(10) Patent No.: US 6,732,142 B1
(45) Date of Patent: May 4, 2004

(54) METHOD AND APPARATUS FOR AUDIBLE PRESENTATION OF WEB PAGE CONTENT

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/490,747

(22) Filed: Jan. 25, 2000

(51) Int. Cl.[7] .......................... G06F 15/16; H04M 1/64

(52) U.S. Cl. ...................... 709/203; 709/205; 709/219; 379/88.13; 379/88.17

(58) Field of Search ................................ 709/203–205, 709/212, 216–219, 231, 232; 379/88.25, 67.1, 93.01, 3, 88.13, 12, 88.14, 17, 85, 101.01, 908; 704/260, 270, 258

(56) References Cited

U.S. PATENT DOCUMENTS 5,195,092 A * 3/1993 Wilson et al. .............. 725/146
5,444,768 A 8/1995 Lemaire et al.
5,594,658 A 1/1997 Lemaire et al.
5,613,038 A 3/1997 Lemaire et al.
5,864,870 A * 1/1999 Guck ...................... 707/104.1
5,903,727 A * 5/1999 Nielsen ...................... 709/212
6,199,076 B1 * 3/2001 Logan et al. ............ 707/501.1
6,324,182 B1 * 11/2001 Burns et al. ................ 370/429
6,349,132 B1 * 2/2002 Wesemann et al. ...... 379/88.17
6,354,748 B1 * 3/2002 Vrvilo ........................ 709/204
6,400,806 B1 * 6/2002 Uppaluru ................. 379/88.02

* cited by examiner

*Primary Examiner*—Wen-Tai Lin
(74) *Attorney, Agent, or Firm*—Roy W. Truelson

(57) ABSTRACT

A web user may elect to have certain frequently changing web content audibly presented in the background while performing other tasks. Content may be audibly presented when it changes, or at user-specified intervals. Audible presentation does not require that any other task in which the user is engaged be interrupted. Preferably, audible background presentation is an optional feature in a web browser. The user selects web content by highlighting a portion or portions of one or more web pages. The user specifies any of various options for audible presentation, such as at fixed intervals, every time any content changes, or every time selected content changes. At the specified intervals or events, the selected web content is converted from text to speech, and audibly played over the computer's speaker. The audible presentation of web content in the background as described herein enables a user to perform other tasks while listening to web content, much as one might perform other tasks while listening to a radio broadcast in the background, significantly improving user productivity, enjoyment or general enlightenment.

14 Claims, 9 Drawing Sheets

METHOD AND APPARATUS FOR AUDIBLE PRESENTATION OF WEB PAGE CONTENT

CROSS-REFERENCE TO RELATED APPLICATION

The present application is related to commonly assigned application Ser. No. 09/660661, to Cary L. Bates, et al., entitled "Web Page Formatting for Audible Presentation" now abandoned, filed on the same date as the present application, which is herein incorporated by reference.

FIELD OF THE INVENTION

The present invention relates to the use of the Internet, and in particular, to browsers or similar devices which present web page content to a user.

BACKGROUND OF THE INVENTION

One of the most remarkable applications of technology we have seen in recent years is the World Wide Web, often known simply as the "web". Nonexistent only a few short years ago, it has suddenly burst upon us. People from schoolchildren to the elderly are learning to use the web, and finding an almost endless variety of information from the convenience of their homes or places of work. Businesses, government, organizations, and even ordinary individuals are making information available on the web, to the degree that it is now the expectation that anything worth knowing about is available somewhere on the web.

Although a great deal of information is available on the web, accessing this information can be difficult and time consuming, as any web user knows. Self-styled prophets of web technology have predicted no end of practical and beneficial uses of the web, if only problems of speed and ease of use can be solved. Accordingly, a great deal of research and development resources have been directed to these problems in recent years. While some progress has been made in the form of faster hardware, browsers which are more capable and easier to use, and so on, much improvement is still needed.

Nearly all web browsers follow the paradigm of a user visually examining web content presented on a display. I.e., typically a user sits in front of a computer display screen, and enters commands to view web pages presented by the user's browser. A great deal of effort is expended in the formatting of web pages for proper visual appeal and ease of understanding. The browser may run in a window, so that the user may switch back and forth from the browser to some other tasks running in other windows. But it is usually expected that when the user is viewing a web page in the browser, his entire attention will be directed thereto, and other tasks will be foreclosed.

Some of the information available on the web is of a form which is updated on a relatively frequent basis, and which may be followed in "real time", i.e., as the information is being generated. Examples of such information include up-to-the-minute market reports, coverage of sporting events, certain news events, etc. In order to follow such information, some web browsers support periodic polling of a specified web server at a specified polling interval, to determine whether information at a given web site has changed. While this is an improvement over requiring the user to manually update a web page at intervals, the manner of presentation is still less than optimal in many cases. The user may be busy with some other task (either at the computer workstation, or at a desk or somewhere in proximity to the computer). In order to obtain the updated information, the user must interrupt his other task, and view his browser. An unrecognized need exists for an alternative method of presenting such information to the user, which is less disruptive of other tasks in which the user may be

SUMMARY OF THE INVENTION

In accordance with the present invention, a web user may elect to have certain frequently changing web content audibly presented in the background while performing other tasks. Content may be audibly presented when it changes, or at user-specified intervals. Audible presentation does not require that any other task in which the user is engaged be interrupted.

In the preferred embodiment, audible background presentation is an optional feature in a web browser. The user selects web content by highlighting a portion or portions of one or more web pages. The user specifies any of various options for audible presentation, such as at fixed intervals, every time any content changes, or every time selected content changes. At the specified intervals or events, the selected web content is converted from text to speech, and audibly played over the computer's speaker.

In an alternative embodiment, a web page has a viewable version and an audible version. The user selects the audible version, and the various parameters for audible presentation. The audible version is then played directly over the computer's speaker, without the need to convert from text to speech.

The audible presentation of web content in the background as described herein enables a user to perform other tasks while listening to web content, much as one might perform other tasks while listening to a radio broadcast in the background. The audio presentation may be thought of as a second "dimension" for receiving information, whereby a user can operate in both the video and audio dimensions independently, significantly improving user productivity, enjoyment or general enlightenment.

The details of the present invention, both as to its structure and operation, can best be understood in reference to the accompanying drawings, in which like reference numerals refer to like parts, and in which:

DESCRIPTION OF THE PREFERRED EMBODIMENT

Overview

Figure 1:
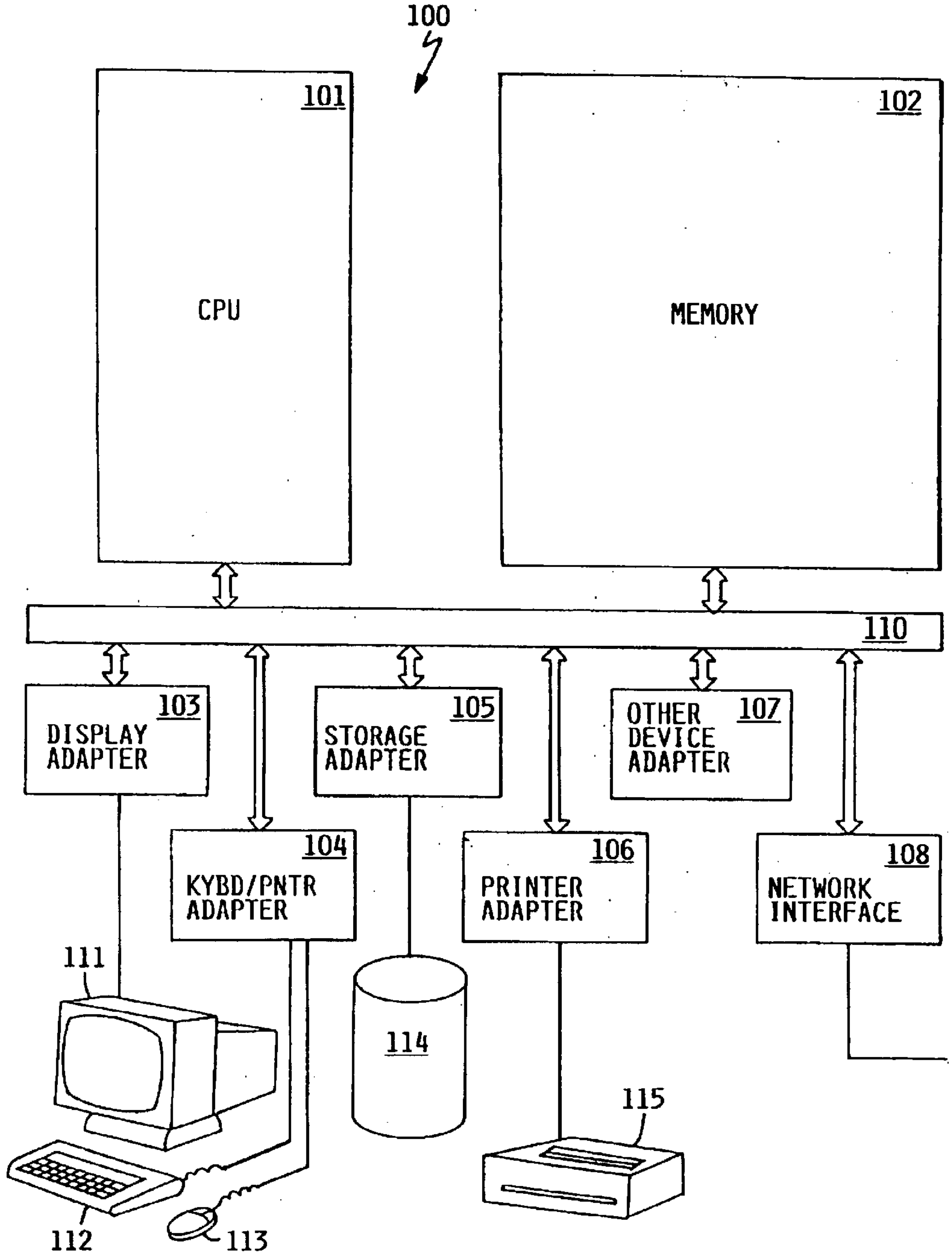
FIG. 1 is a high-level block diagram of a typical client computer system for accessing web content, according to the preferred embodiment of the present invention.

Prior to discussing the operation of embodiments of the invention, a brief overview discussion of the Internet is provided herein.

The term "Internet" is a shortened version of "Internetwork", and refers commonly to a collection of computer networks that utilize the TCP/IP suite of protocols, well-known in the art of computer networking. TCP/IP is an acronym for "Transport Control Protocol/Internet Protocol", a software protocol that facilitates communications between computers.

Networked systems typically follow a client server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without needing to know any working details about the other program or the server itself. In networked systems, a client is usually a computer that accesses shared network resources provided by another computer (i.e., a server).

A server is typically a remote computer system accessible over a communications medium such as the Internet. The server scans and searches for information sources. Based upon such requests by the user, the server presents filtered, electronic information to the user as server response to the client process. The client process may be active in a first computer system, and the server process may be active in a second computer system; the processes communicate with one another over a communications medium that allows multiple clients to take advantage of the information gathering capabilities of the server. A server can thus be described as a network computer that runs administrative software that controls access to all or part of the network and its resources, such as data on a disk drive. A computer acting as a server makes resources available to computers acting as workstations on the network.

Client and server can communicate with one another utilizing the functionality provided by a hypertext transfer protocol (HTTP). The World Wide Web (WWW), or simply, the "web", includes all servers adhering to this protocol, which are accessible to clients via a Universal Resource Locator (URL) address. Internet services can be accessed by specifying Universal Resource Locators that have two basic components: a protocol to be used and an object pathname. For example, the Universal Resource Locator address, "http://www.uspto.gov/web/menu/intro.html" is an address to an introduction about the U.S. Patent and Trademark Office. The URL specifies a hypertext transfer protocol ("http") and a name ("www.uspto.gov") of the server. The server name is associated with a unique, numeric value (i.e., a TCP/IP address). The URL also specifies the name of the file that contains the text ("intro.html") and the hierarchical directory ("web") and subdirectory ("menu") structure in which the file resides on the server.

Active within the client is a first process, known as a "browser, that establishes the connection with the server, sends HTTP requests to the server, receives HTTP responses from the server, and presents information to the user. The server itself executes corresponding server software that presents information to the client in the form of HTTP responses. The HTTP responses correspond to "web pages" constructed from a Hypertext Markup Language (HTML), or other server-generated data.

The browser retrieves a web page from the server and displays it to the user at the client. A "web page" (also referred to as a "page" or a "document") is a data file written in a hyper-text language, such as HTML, that may have text, graphic images, and even multimedia objects, such as sound recordings or moving video clips associated with that data file. The page contains control tags and data. The control tags identify the structure: for example, the headings, subheadings, paragraphs, lists, and embedding of images. The data consists of the contents, such as text or multimedia, that will be displayed or played to the user. A browser interprets the control tags and formats the data according to the structure specified by the control tags to create a viewable object that the browser displays, plays or otherwise performs to the user. A control tag may direct the browser to retrieve a page from another source and place it at the location specified by the control tag. In this way, the browser can build a viewable object that contains multiple components, such as spreadsheets, text, hotlinks, pictures, sound, chat-rooms, and video objects. A web page can be constructed by loading one or more separate files into an active directory or file structure that is then displayed as a viewable object within a graphical user interface.

DETAILED DESCRIPTION

Referring to the Drawing, wherein like numbers denote like parts throughout the several views, FIG. 1 is a high-level block diagram of a typical client workstation computer system 100 attached to the Internet, from which a user accesses Internet servers and performs other useful work, according to the preferred embodiment. Computer system 100 includes CPU 101, main memory 102, various device adapters and interfaces 103–108, and communications bus 110. CPU 101 is a general-purpose programmable processor, executing instructions stored in memory 102; while a single CPU is shown in FIG. 1, it should be understood that computer systems having multiple CPUs could be used. Memory 102 is a random-access semiconductor memory for storing data and programs; memory is shown conceptually as a single monolithic entity, it being understood that memory is often arranged in a hierarchy of caches and other memory devices. Communications bus 110 supports transfer of data, commands and other information between different devices; while shown in simplified form as a single bus, it may be structured as multiple buses, and may be arranged in a hierarchical form. Display adapter 103 supports video display 111, which is typically a cathode-ray tube display, although other display technologies may be used. Keyboard/pointer adapter 104 supports keyboard 112 and pointing device 113, depicted as a mouse, it being understood that other forms of input devices could be used. Storage adapter 105 supports one or more data storage devices 114, which are typically rotating magnetic hard disk drives, although other data storage devices could be used. Printer adapter 106 supports printer 115. Adapter 107 may support any of a variety of additional devices, such as CD-ROM drives, audio devices, etc. Internet interface 108 provides a physical interface to the Internet. In a typical personal computer system, this interface often comprises a modem connected to a telephone line, through which an Internet access provider or on-line service provider is reached. However, many other types of interface are possible. For example, computer system 100 may be connected to a local mainframe computer system via a local area network using an Ethernet, Token Ring, or other protocol, the mainframe in turn being connected to the Internet. Alternatively, Internet access may be provided through cable TV, wireless, or other types of connection. Computer system 100 will typically be any of various models of single-user computer systems known as "personal computers". The representation of FIG. 1 is intended as an exemplary simplified representation, it being understood that many variations in system configuration are possible in addition to those mentioned here. Furthermore, a browser function accessing web pages in accordance with the present invention need not be a personal computer system, and may be a larger computer system, a notebook or laptop computer, or any of various hardware variations. In particular, such a web browser need not be a general-purpose computer system at all, but may be a special-purpose device for accessing the web, such as an Internet access box for a television set, or a portable wireless web accessing device.

Figure 2:
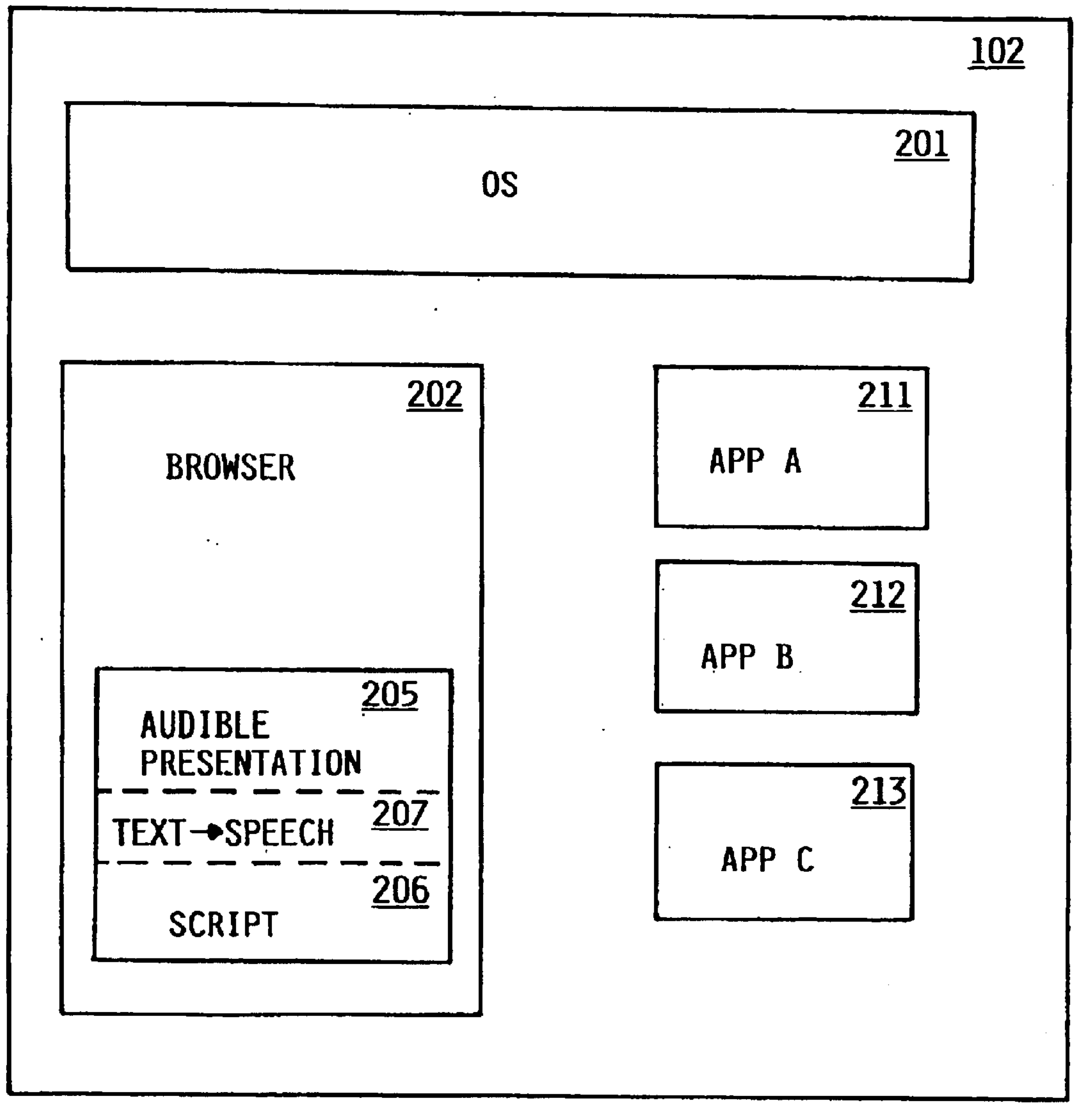
FIG. 2 is a conceptual illustration of the major software components of a client computer system for accessing web content, in accordance with the preferred embodiment.

FIG. 2 is a conceptual illustration of the major software components of client workstation system 100 in memory 102. Operating system 201 provides various low-level software functions, such as device interfaces, management of memory pages, management of windowing interfaces, management of multiple tasks, etc. as is well-known in the art. Browser 202 provides a user interface to the web. Browser 202 may be integrated into operating system 201, or may be a separate application program. In addition to various conventional browser functions, such as rendering web pages, navigation aids (forward, backward,favorites list, etc.) filing and printing, and so on, as are known in the art, browser 202 contains background audible presentation function 205. Audible presentation function 205 supports the audible rendition of web content in the background, i.e, while the user is performing other unrelated tasks, as more fully described herein. Audible presentation function 205 uses audible presentation script file 206 to define the parameters of audible background presentation, and text-to-speech conversion software 207 to render text from the web in audible form. Memory 102 additionally may contain any of various applications for performing useful work, which are shown generically in FIG. 2 as applications 211–213. These applications may include, for example, word processing, spreadsheet, electronic calendar, accounting, graphics, computer code development, or any of thousands of other possible applications.

While a certain number of applications, files or other entities are shown in FIG. 2, it will be understood that these are shown for purposes of illustration only, and that the actual number of such entities may vary. Additionally, while the software components of FIG. 2 are shown conceptually as residing in memory, it will be understood that in general the memory of a computer system will be too small to hold all programs and data simultaneously, and that information is typically stored in data storage 114, comprising one or more mass storage devices such as rotating magnetic disk drives, and that the information is paged into memory by operating system 201 as required.

Figure 3:
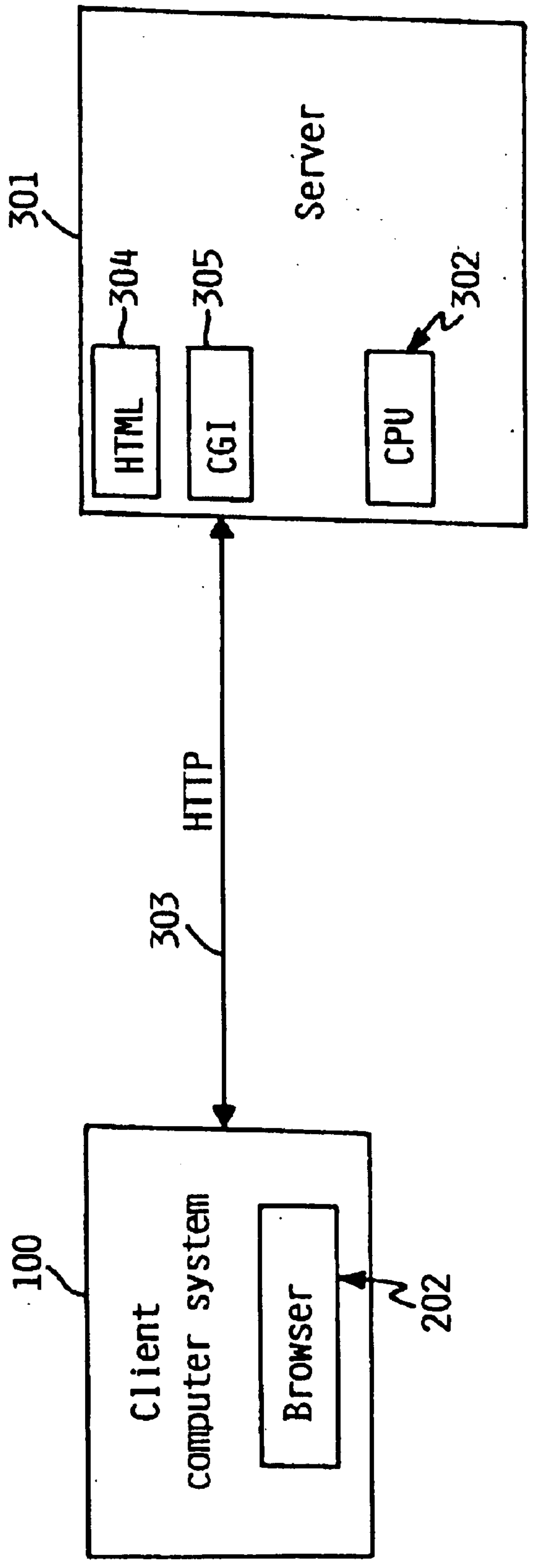
FIG. 3 is a block diagram illustrative of a client/server architecture, according to the preferred embodiment.

FIG. 3 is a block diagram illustrative of a client/server architecture. Client system 100 and server system 301 communicate by utilizing the functionality provided by HTTP. Active within client system 100 is browser 202, which established connections with server 100 and presents information to the user. Server 301 executes the corresponding server software, which presents information to the client in the form of HTTP responses 303. The HTTP responses correspond to the web pages represented using HTML or other data generated by server 301. Server 301 generates HTML document 304, which is a file of control codes that server 301 sends to client 100 and which browser 202 then interprets to present information to the user. Server 301 also provides Common Gateway Interface (CGI) program 305, which allows client 100 to direct server 301 to commence execution of the sepcified program contained within server 301. CGI program 305 executes on the server's CPU 302. Referring again to FIG. 3, using the CGI program and HTTP responses 303, server 301 may notify client 100 of the results of that execution upon completion. Although the protocols of HTML, CGI and HTTP are shown, any suitable protocols could be used.

Figure 4:
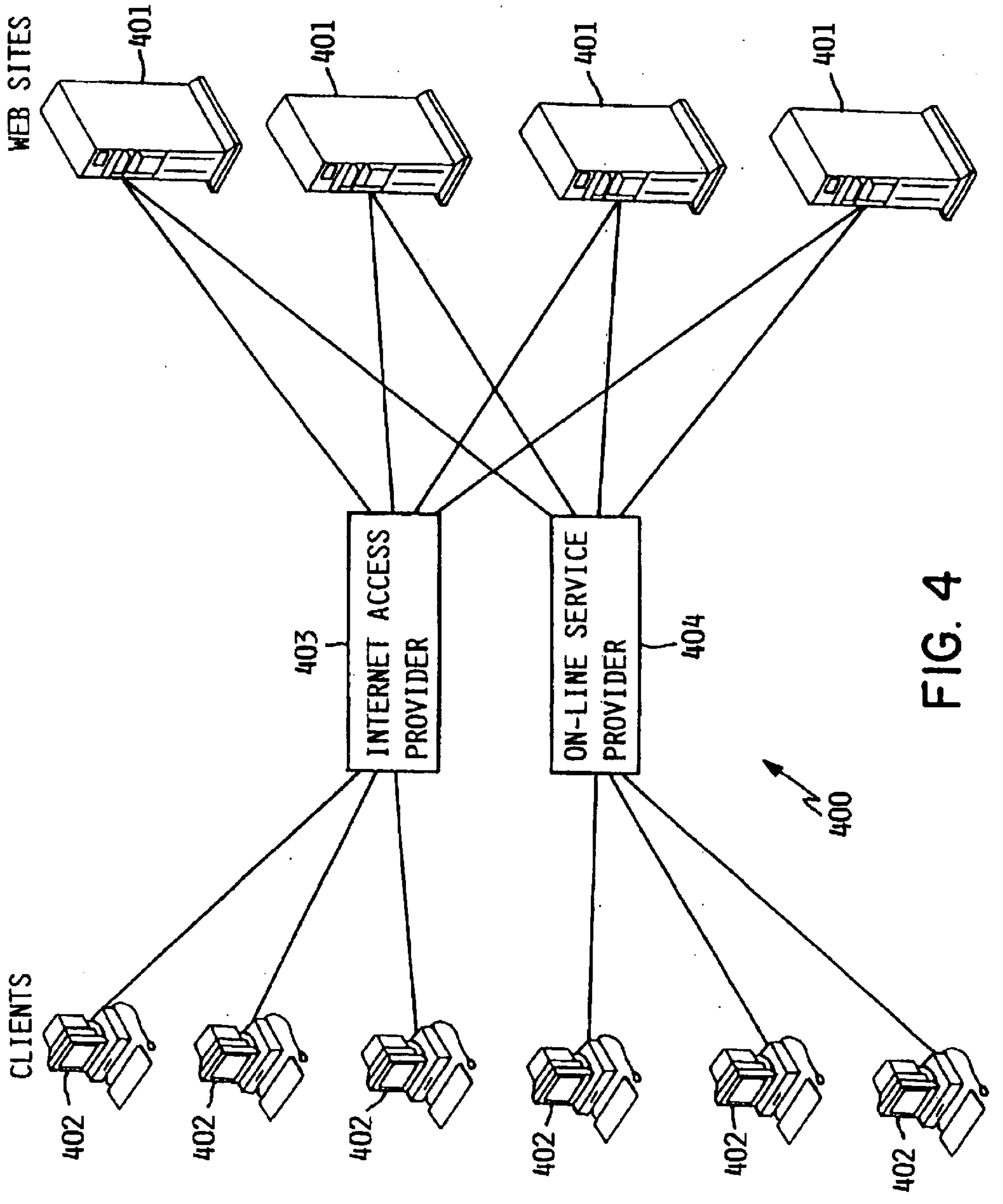
FIG. 4 is a simplified representation of a computer network such as the Internet, according to the preferred embodiment.

FIG. 4 is a simplified representation of a computer network 400. Computer network 400 is representative of the Internet, which can be described as a known computer network based on the client-server model discussed herein. Conceptually, the Internet includes a large network of servers 401 (such as server 301) that are accessible by clients 402, typically computers such as computer system 100, through some private Internet access provider 403 or an on-line service provider 404. Each of the clients 402 may run a respective browser to access servers 401 via the access providers. Each server 401 operates a so-called "web site" that supports files in the form of documents or pages. A network path to servers 401 is identified by a Universal Resource Locator (URL) having a known syntax for defining a network connection. While various relatively direct paths are shown, it will be understood that FIG. 4 is a conceptual representation only, and that a computer network such as the Internet may in fact have a far more complex structure.

Figure 5:
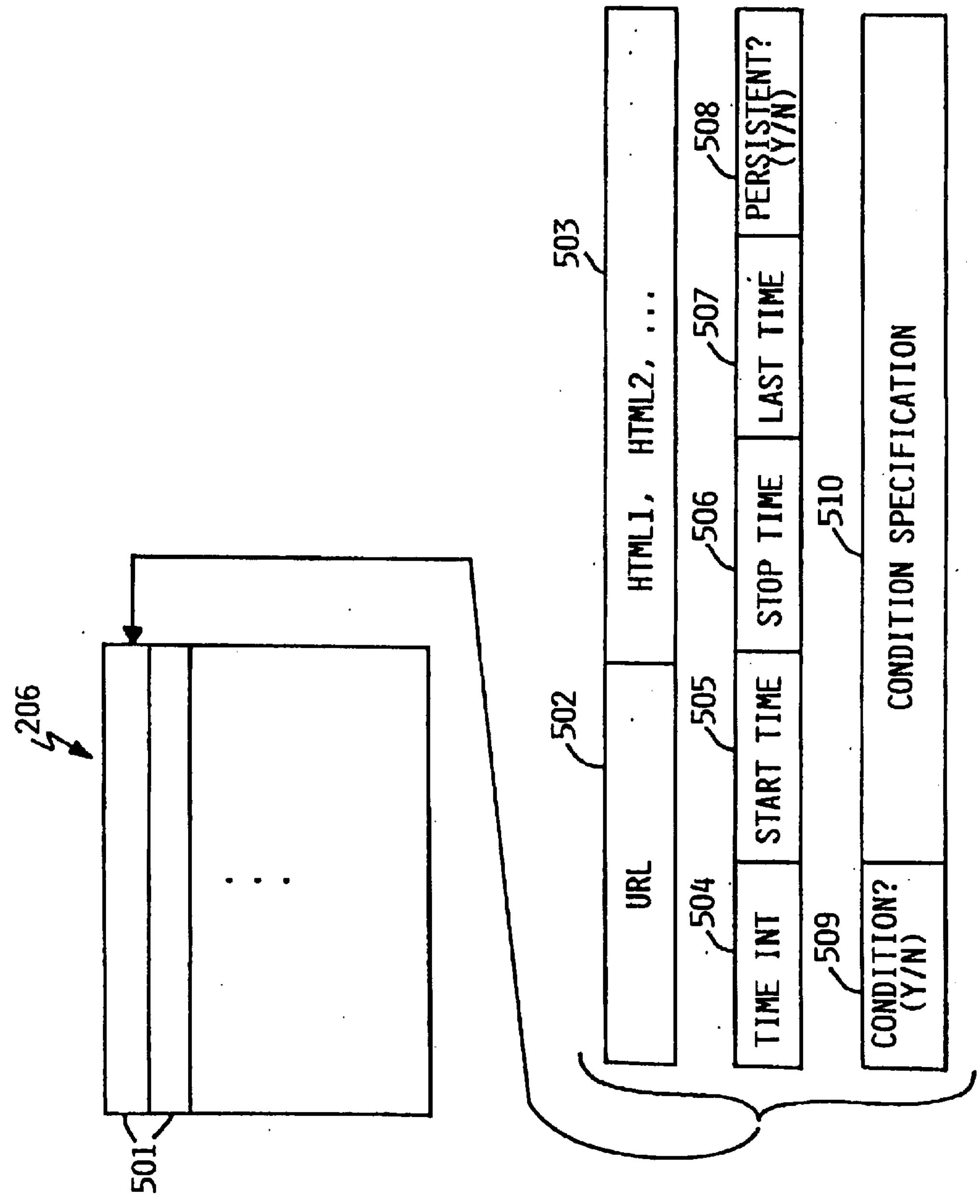
FIG. 5 represents the structure of a script file for storing the parameters of audible web content presentation, according to the preferred embodiment.

In accordance with the preferred embodiment of the present invention, a web user specifies parameters for audible presentation of certain web content in the background, and may listen to the specified web content at a later time in the background, i.e., while the user is performing other tasks. In order to support background audible presentation, a script 206 is generated which specifies the parameters of the presentation. FIG. 5 illustrates the structure of script 206.

As shown in FIG. 5, script 206 is a file containing one or more entries 501, each entry specifying the parameters of an audible presentation, i.e., specifying some web content and the times and conditions under which the web content will be audibly presented. In particular, a typical entry 501 contains URL 502, HTML tag(s) 503, time interval 504, start time 505, stop time 506, last time played 507, persistence flag 508, condition flag 509, and condition field 510. URL 502 specifies the URL at which the web content to be audibly presented resides. HTML tag(s) 503 specifies one or more HTML tags to be audibly presented within the web page located with URL 502. It is anticipated that in many cases a user will wish to hear only a portion of a web page, that portion being specified by HTML tag(s) 503. Where a user wishes to hear an entire web page, a single special tag indicating full play of the web page can be inserted in HTML tag field 503. Time interval 504 specifies a time interval for repeating the audio presentation. As more fully explained herein, audible presentation function 205 checks whether certain specified conditions for audio presentation are satisfied at the interval specified by time interval field 504, although the audio will actually be presented only if the conditions are met. Start time 505 and stop time 506 specify the time at which audible presentation is to begin and stop, respectively. Either or both start time field 505 or stop time field 506 may contain a suitable zero value, the former indicating that audio presentation is to begin immediately, and the later indicating that it continue indefinitely (i.e., until browser 202 is shut down, or the user orders it to stop by editing script 206). Last time played 507 stores the time at which audio presentation was last made or conditions for presentation were last checked. Persistence flag 508 is a flag field indicating whether the entry is to exist across loads of browser 202. I.e., if persistence flag is "Y", the entry is persistent and is restarted every time browser 202 is reloaded for execution. If persistence flag is "N", the entry is deleted upon loading the browser.

Condition flag 509 indicates whether audible presentation is conditional upon the presence of some condition, the condition being specified by condition field 510. Condition field 510 is a boolean expression specifying a condition for playing the specified web content. There are several possible embodiments for conditional audible presentation. The most common condition would be that web content has changed, i.e., that the current content of the web page or portion thereof specified by URL 502 and HTML tags 503 is unequal to the previous content. In a simple embodiment, it would be possible to verify whether the current content is the same as the previous content by any of various means. For example, a cyclic redundancy check sum (CRC) can be taken of the previous content, which can be compared with a CRC of the new content. Alternatively, some web sites contain the date and timestamp of the most recent update, which could be compared. In an alternative, more complex embodiment, it would be possible to support other types of conditions. For example, if a user were following prices of selected securities, he may wish to hear an updated price only if it differs from the previous price by more than a specified amount. A numeric price quantity could be extracted from an HTML string, saved, and compared with a current quantity to determine whether the two quantities differed by more than a specified amount.

Figure 6:
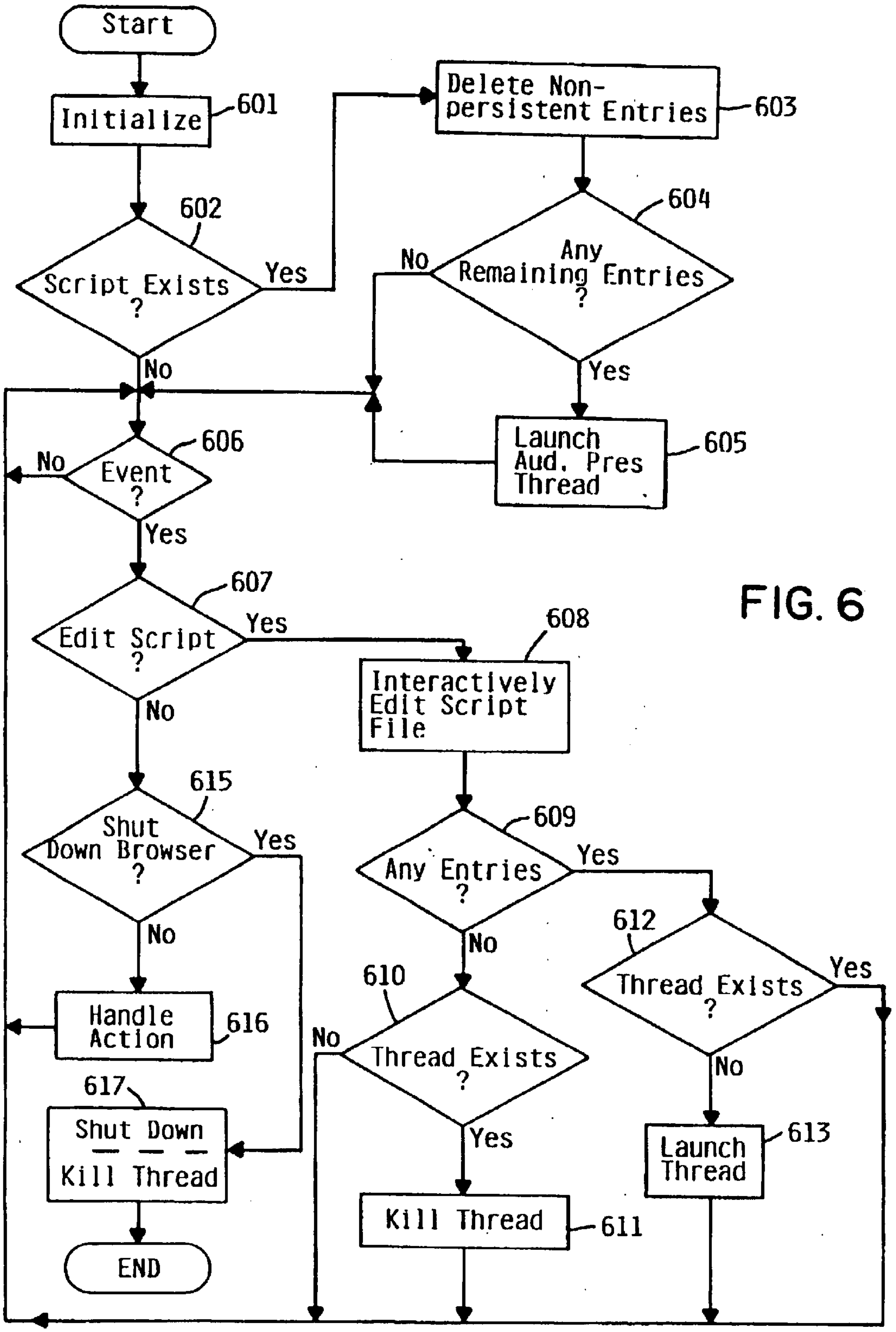
FIG. 6 is a high-level flow diagram of the steps performed by the browser, in accordance with the preferred embodiment.

FIG. 6 is a high-level flow diagram of the steps performed by browser 202, in accordance with the preferred embodiment. The browser is initialized and a connection is established with the Internet through some internet provider (step 601). As part of the initialization process, browser 202 checks to see whether a script 206 exists (step 602). If a script exists, any non-persistent entries in the script are deleted, i.e., any entries for which persistence flag 508 is set to "N" are deleted (step 603). If, after deletion, there are any remaining entries in script 206 (step 604), the audible presentation thread is launched (step 605). The operation of the audible presentation thread is described more fully herein, and illustrated in FIG. 7. After all required initialization steps are performed, the browser continues to step 606.

The browser, being interactive, sits in a loop waiting for an event (step 606). An event may be a user input, such as a command to take a link to a web site, to save or print a web page, to edit a favorites list, etc. Alternatively, an event may be something coming from the Internet, such as incoming web content in response to a previously submitted request. When an event occurs, the "Y" branch from step 606 is taken to handle the event.

If the event is invoking the function to edit the script file 206 (step 607), browser 202 presents the user with interactive editing screens (described below), from which the user may edit the script file (step 608). As noted above, script 206 may contain more than one entry 501, so that audible background presentation from multiple web sites, or based on multiple different conditions, are concurrently supported. Preferably, audible presentation function 205 includes an editing function for creating and editing script file 206. In the preferred embodiment, the editing function is invoked by the user from a pull-down menu on the browser's menu bar, or similar structure. The audible presentation function 205 preferably presents one or more input screens to a user for specifying the different parameters of web content audible presentation. Preferably, the editing function is invokable while the browser is browsing a web page, so that the user may select the currently active URL and portions of the displayed web page (e.g., using pointing device 113), without having to type in URLs and HTML tags. Parameters such as time interval, start time, etc., are manually input.

Figure 8:
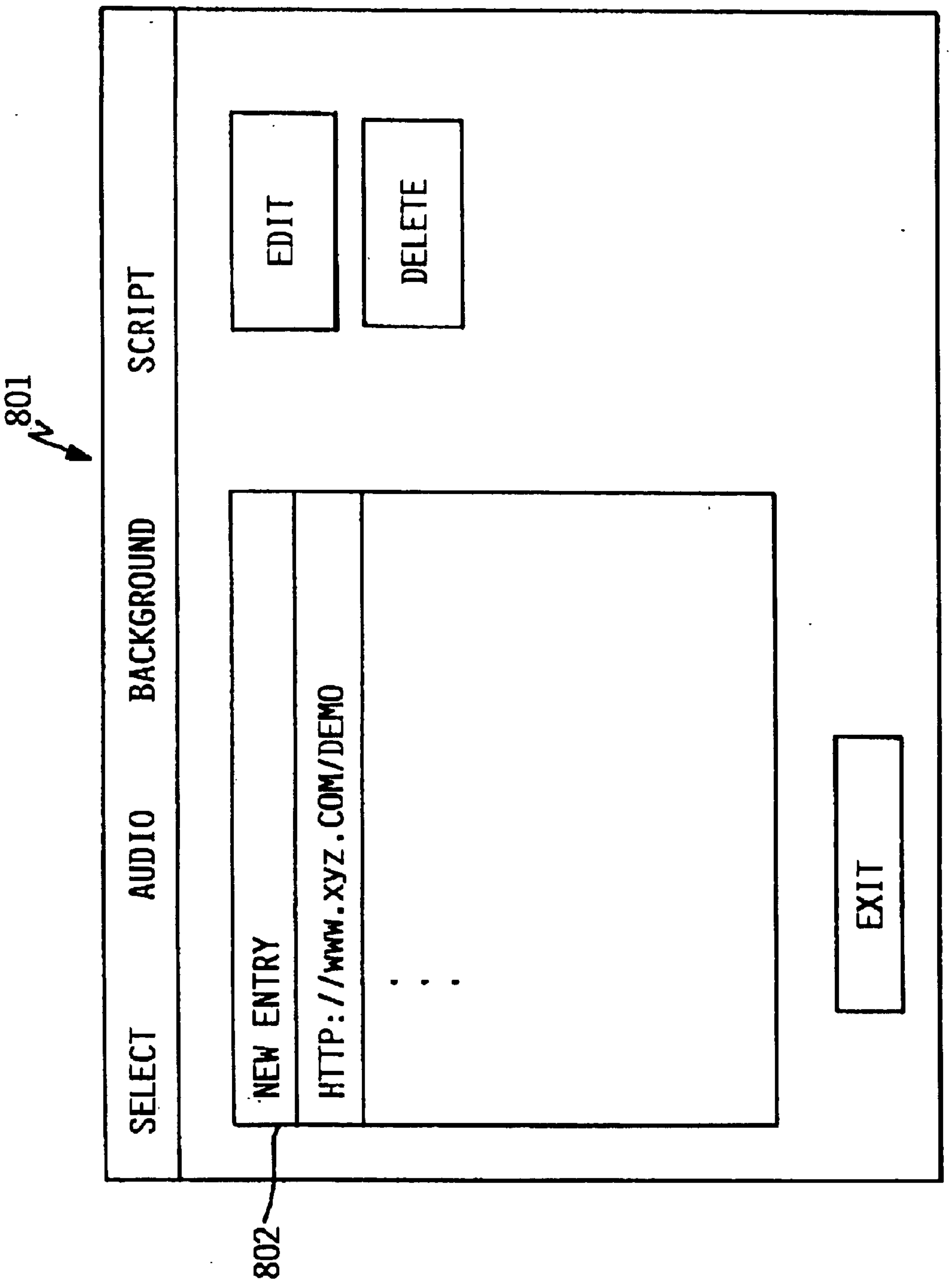
FIG. 8 is an interactive screen for selecting script file entries to be edited or deleted, according to the preferred embodiment.
Figure 9:
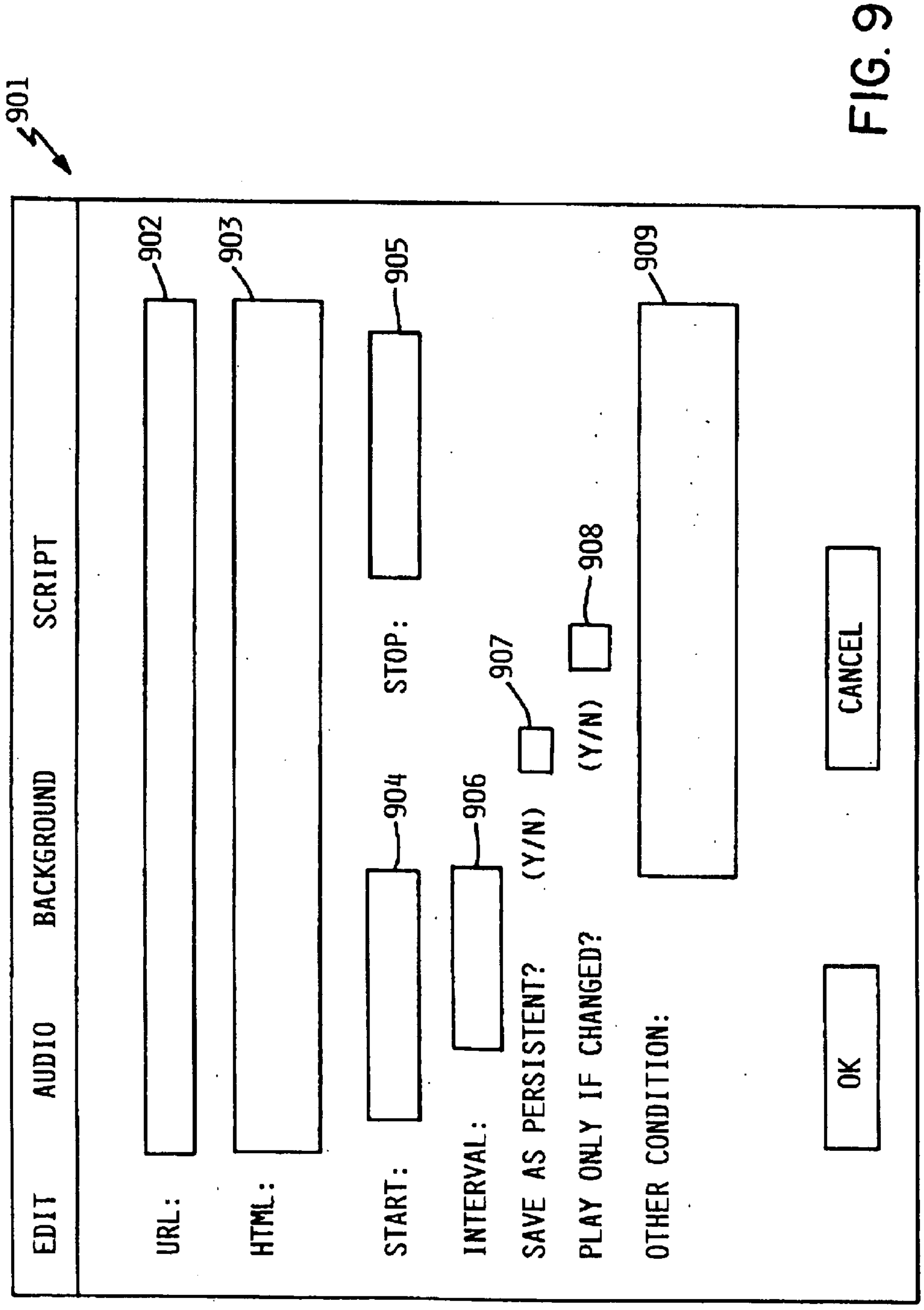
FIG. 9 is an interactive screen for editing a script file entry, according to the preferred embodiment.

FIGS. 8 and 9 show interactive editing screens used by function 205 to receive interactive input for editing file 206. Upon entering the edit function at step 608, audible presentation function 205 presents selection menu 801 as shown in FIG. 8, from which an entry 501 from script file 206 may be selected using cursor pointing device 113. As shown in FIG. 8, the first entry 802 in the selection list is designated "new entry", which means that a new entry 501 will be created for editing using default values. The entries below entry 802 represent existing entries in script 206, the URL fields of these entries being displayed. The user may delete any existing entry by selecting it, and clicking on the "Delete" button. Alternatively, the user may edit any entry by selecting it, and clicking on the "Edit" button.

When the user selects an entry and clicks on the "Edit" button, editing screen 901, as shown in FIG. 9, is presented to the user. Various fields in editing screen 901 contain default values. If editing an existing entry 501 in script 206, these default values are the values in the existing entry. If "new entry" 802 was selected, URL field 902 contains the currently active URL being displayed by browser 202. If the user has selected a portion of the displayed web page, HTML field 903 contains the HTML tags for the selected portion. By default, start time 904 and stop time 905 are blank. The default interval 906 is 15 minutes, and persistence flag 907 is off. Input fields 902–907 correspond to fields 502, 503, 505, 506, 504 and 508, respectively, of script entry 501.

The user may specify that the web page will be audibly played only if changed in field 908. If the user makes this election, function 205 automatically sets condition flag 509 to "Y", and sets the value of condition field 510 accordingly. Alternatively, the user may manually specify a more complex condition in field 909, which would require greater knowledge of the condition specification syntax. When finished editing, the user clicks on the "OK" or "Cancel" button to exit screen 901.

Upon exiting the interactive script file editing screens at step 608, the script file is saved if required. If there are no entries 501 in the edited script file (step 609), and an audible presentation thread is currently running in the background (step 610), the thread is killed (step 611), and the browser returns to the idle loop at step 606. In this case, the user evidently removed any entries 501 from script file 206 at step 608. If there are no entries, and no thread exists (the "N" branch from step 610), it is not necessary to perform any action, and the browser returns to the idle loop at step 606. If the edited script file contains at least one entry 501 (the "Y" branch from step 609), and no audible presentation thread exists (step 612), an audible presentation thread is launched (step 613), and the browser returns to the idle loop at step 606. If a thread exists (the "Y" branch from step 612), it is not necessary to perform any further action, and the browser returns to step 606.

If the new event was not invoking the script file edit function ("N" branch from step 607), and is anything other than a shut down event (step 615), the event is handled in the conventional manner (step 616), and the browser returns to step 606. If the event is a user command to shut down the browser ("Y" branch from step 615), the browser is shut down (step 617). As part of the shut-down process, any audible presentation thread running in the background is killed. "Shut down" means that the application is stopped, any necessary dynamic variables are saved, and memory used by the application is released for use by other applications; "shut down" is to be distinguished from putting an application in the background, wherein the application remains resident in memory and may continue to execute, but is displayed to the user in a background manner (either as an icon, a partially obscured window, or other appropriate manner).

Figure 7:
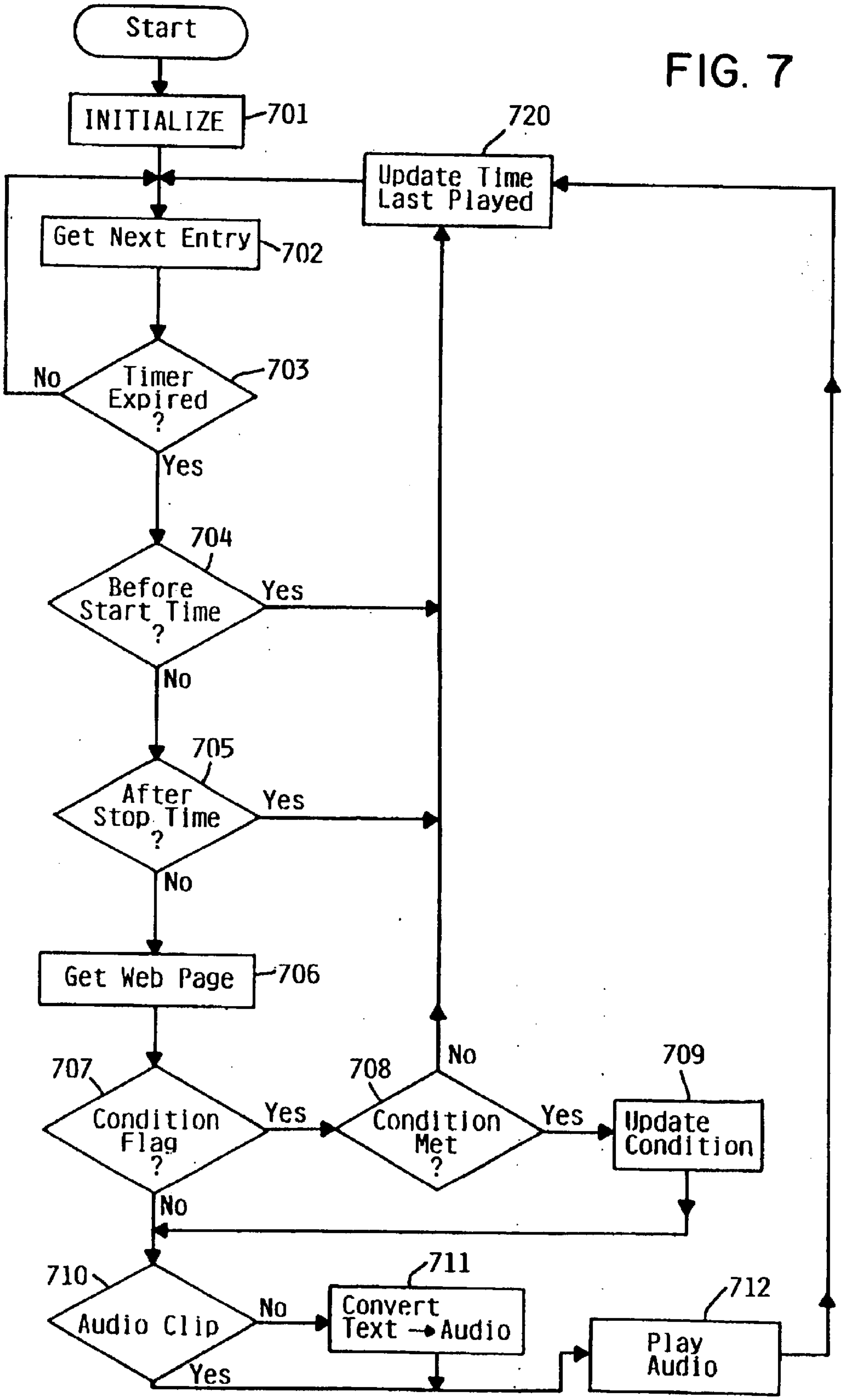
FIG. 7 is a flow diagram showing the operation of the audible presentation thread, according to the preferred embodiment.

FIG. 7 is a flow diagram showing the operation of the audible presentation thread running within function 205. Once launched, the audible presentation thread remains resident on computer 100, executing in the background while other functions in browser 202, and/or other applications 211–213, may also be executing. As shown in FIG. 7, the audio thread is initialized (step 701), and then enters a waiting loop consisting of steps 702 and 703, wherein it waits for the expiration of the timer. I.e., at step 702, the thread retrieves the next entry 501 from script 206. At step 703, the thread determines whether a time interval has expired. Specifically, the time interval 504 is added to time last played 507. If the current time is greater than the sum, then it is time to check the conditions for playing the web content (the "Y" branch from step 703). Audible presentation function 205 checks whether the current time is after the start time 505 specified in the entry 501 of script 206 (step 704). If not, it proceeds to step 720. If the start time has already passed, function 205 checks whether the current time is before the stop time 506 specified in script 206 (step 705). If not, it proceeds to step 720.

If both start time has passed, and stop time has not been exceeded, function 205 retrieves a current version of the web page from the server at the URL specified in URL field 502 (step 706). Function 205 then checks condition flag 509 (step 707). If condition flag 509 is set "Y", function 205 evaluates the condition specified in condition field 510 (step 708). If the condition evaluates to false, the audible presentation is not made, and the thread proceeds to step 720. If the condition evaluates to true, it may be necessary to update condition field 510 (step 709). For example, if condition field 510 specifies a change in content of the web page by saving a CRC, the new CRC will be saved in condition field 510 for comparing with subsequent web pages at subsequent time intervals.

If condition flag 509 is "N" or the condition in field 510 evaluates to true, the web content will be audibly presented in the background. Audible presentation function checks the nature of the web content. If the web content contains text (step 710), the text is converted to audible speech using text-to-speech converter 207 (step 711). A suitable text-to-speech converter is preferably software embedded in audible presentation function 205 of browser 202, but it may also be a separate application residing in memory 102, or may also be a special-purpose device (not shown) attached to computer system 100. If the web content contains only an audio clip, step 711 is by-passed. Function 205 then plays the audio version of the web content (step 712).

After audibly playing the web content, or after checking for certain pre-conditions as explained above, function 205 updates last time played 507 in the entry 501 from script 206 (step 720). As can be seen from the above description, last time played 507 actually represents the last time a "Y" branch was taken from step 703, whether or not anything was actually played at that time. Function 205 then returns to step 702 to get the next entry 501 from script 206. Function 205 cycles through the entries 501 in script 206 indefinitely at step 702, so that after reaching the last entry in script file 206, it starts again at the first entry.

In the preferred embodiment, audible presentation function 205 in browser 202 converts text HTML to audible speech using a text-to-speech converter, for presenting the web content in the background. This embodiment has the advantage that it requires no modification of existing web content for implementation, i.e., the implementation is supported entirely within the client's workstation. An alternative embodiment would utilize a related web formatting invention described in commonly assigned co-pending application Ser. No. 09/660,661, to Cary L. Bates, et al., entitled "Web Page Formatting for Audible Presentation" now abandoned, filed on the same date as the present application, which is herein incorporated by reference. In this alternative embodiment, web pages could have alternative audio formats provided by the server. If a web page selected for background audio presentation had such an alternative audio format, audible presentation function 205 would select the alternative audio format for play, rather than convert the HTML text to speech at the browser.

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as data storage device 104.

Although a specific embodiment of the invention has been disclosed along with certain alternatives, it will be recognized by those skilled in the art that additional variations in form and detail may be made within the scope of the following claims.

What is claimed is:

1. A method of presenting information from the web, comprising the steps of:

selecting web content for audible background presentation on a web client digital device, said web client digital device supporting concurrent execution of a plurality of tasks;

specifying at least one audible presentation parameter said at least one audible presentation parameter determining when said selected web content will be audibly presented; and audibly presenting said selected web content on said web client digital device at a time determined by said at least one audible presentation parameter, said step of audibly presenting said selected web content being performed as a background task of said pluralit of tasks executing on said web client digital device, concurrently with visually presenting independent information on a display of said web client digital device, said independent information being presented as at least one task of said plurality of tasks executing on said web client digital device other than said background task, said independent information being unaffected by said audio presentation;

wherein said at least one audible presentation parameter comprises a determination whether said selected web content has changed since a previous audible presentation.

2. A method of presenting information from the web, comprising the steps of:

selecting web content for audible background presentation on a web client digital device, said web client digital device supporting concurrent execution of a plurality of tasks;

specifying at least one audible presentation parameter, said at least one audible presentation parameter determining when said selected web content will be audibly presented; and audibly presenting said selected web content on said web client digital device at a time determined by said at least one audible presentation parameter, said step of audibly presenting said selected web content being performed as a background task of said plurality of tasks executing on said web client digital device, concurrently with visually presenting independent information on a display of said web client digital device, said independent information being presented as at least one task of said plurality of tasks executing on said web client digital device other than said background task, said independent information being unaffected by said audio presentation;

wherein said at least one audible presentation parameter comprises a time interval for accessing a web server, and wherein said step of audibly presenting said selected web content comprises the steps of:

accessing said web server a plurality of times at time intervals determined by said time interval parameter to obtain current web content; and audibly presenting said current web content at a plurality of times.

3. The method of claim 2, wherein said step of audibly presenting said selected web content comprises converting selected web content in text form to speech using a text-to-speech converter, and audibly presenting said speech.

4. The method of claim 2, wherein said step of audibly presenting said selected web content comprises audibly presenting an audible version of said web content, said audible version being formatted for audible presentation.

5. The method of claim 2, wherein said step of audibly presenting said current web content at a plurality of times is performed only if said current web content has changed since the last audible presentation.

6. A computer program product for presenting information from the web, said computer program product comprising:

a plurality of processor executable instructions recorded on signal-bearing media, wherein said instructions, when executed by said processor, cause said computer to perform the steps of:

receiving a selection of web content for audible background presentation on said computer, said computer supporting concurrent execution of a plurality of tasks;

receiving a specification of at least one audible presentation parameter said at least one audible presentation parameter determining when said selected web content will be audibly presented; and audibly presenting said selected web content on said computer at a time determined by said at least one audible presentation parameter, said step of audibly presenting said selected web content being performed as a background task of said plurality of tasks executing on said computer, concurrently with visually presenting independent information on a display of said computer, said independent information being visually presented as at least one task of said plurality of tasks executing on said computer other than said background task, said independent information being unaffected by said audio presentation;

wherein said at least one audible presentation parameter comprises a determination whether said selected web content has changed since a previous audible presentation.

7. A computer program product for presenting information from the web, said computer program product comprising:

a plurality of processor executable instructions recorded on signal-bearing media, wherein said instructions, when executed by said processor, cause said computer to perform the steps of:

receiving a selection of web content for audible back around presentation on said computer, said computer supporting concurrent execution of a plurality of tasks;

receiving a specification of at least one audible presentation parameter, said at least one audible presentation parameter determining when said selected web content will be audibly presented; and audibly presenting said selected web content on said computer at a time determined by said at least one audible presentation parameter, said step of audibly presenting said elected web content being performed as a background task of said plurality of tasks executing on said computer, concurrently with visually presenting independent information on a display of said computer, said independent information being visually presented as at least one task of said plurality of tasks executing on said computer other than said background task, said independent information being unaffected by said audio presentation;

wherein said at least one audible presentation parameter comprises a time interval for accessing a web server, and wherein said step of audibly presenting said selected web content comprises the steps of:

accessing said web server a plurality of times at time intervals determined by said time interval parameter to obtain current web content; and audibly presenting said current web content at a plurality of times.

8. The program product of claim 7, wherein said step of audibly presenting said selected web content comprises converting selected web content in text form to speech using a text-to-speech converter, and audibly presenting said speech.

9. The program product of claim 7, wherein said step of audibly presenting said selected web content comprises audibly presenting an audible version of said web content, said audible version being formatted for audible presentation.

10. The program product of claim 7, wherein said step of audibly presenting said current web content at a plurality of times is performed only if said current web content has changed since the last audible presentation.

11. A method of presenting information from the web, comprising the steps of:

visually displaying a web page in a display of a web client digital device, said web client digital device supporting concurrent execution of a plurality of tasks;

interactively selecting at least a portion of said visually displayed web page for audible presentation as a background task of said plurality of tasks executing on said web client digital device;

specifying at least one audible presentation condition, said at least one audible presentation condition determining when said selected portion of said visually displayed web page will be audibly presented;

thereafter determining that said at least one audible presentation condition has been met; and responsive to said step of determining that said at least one audible presentation condition has been met, audibly presenting said selected portion of said visually displayed web page, said step of audibly presenting said selected portion being performed as a background task of said plurality of tasks executing on said web client digital device, concurrently with visually presenting independent information on said display, said independent information being presented as at least one task of said plurality of tasks executing on said web client digital device other than said background task;

wherein said at least one audible presentation condition comprises a determination whether said selected portion of said visually displayed web page has changed since a previous audible presentation.

12. A method of presenting information from the web, comprising the steps of:

visually displaying a web page in a display of a web client digital device, said web client digital device supporting concurrent execution of a plurality of tasks;

interactively selecting at least a portion of said visually displayed web cage for audible presentation as a background task of said plurality of tasks executing on said web client digital device;

specifying at least one audible presentation condition, said at least one audible presentation condition determining when said selected portion of said visually displayed web page will be audibly presented;

thereafter determining that said at least one audible presentation condition has been met; and responsive to said step of determining that said at least one audible presentation condition has been met, audibly presenting said selected portion of said visually displayed web page, said step of audibly presenting said selected portion being performed as a background task of said plurality Of tasks executing on said web client digital device, concurrently with visually presenting independent information on said display, said independent information being presented as at least one task of said plurality of tasks executing on said web client digital device other than said background task;

wherein said at least one audible presentation condition comprises a time interval for accessing a web server, and wherein said step of audibly presenting said selected portion comprises the steps of:

accessing said web server a plurality of times at time intervals determined by said time interval condition to obtain a current version of said web page; and audibly presenting the selected portion of said current version at a plurality of times.

13. The method of claim 12, wherein said step of audibly presenting said selected portion of said visually displayed web page comprises converting said selected portion in text form to speech using a text-to-speech converter, and audibly presenting said speech.

14. The method of claim 12, wherein said step of audibly presenting the selected portion of said current version at a plurality of times is performed only if said current version has changed since the last audible presentation.

* * * * *